United States Patent [19]

Matsui et al.

[11] Patent Number: 5,480,844
[45] Date of Patent: Jan. 2, 1996

[54] CRYSTALLIZED-GLASS-MADE ARTIFICIAL NUCLEUS FOR PEARL, PRODUCTION PROCESS OF THE ARTIFICIAL NUCLEUS, AND PEARL PRODUCED USING THE ARTIFICIAL NUCLEUS

[75] Inventors: Akira Matsui, Kyoto; Yoshinori Morita, Shiga; Hiroyuki Inoue, Shizuoka; Yoshiaki Inoue, Mie, all of Japan

[73] Assignee: J. Morita Mfg. Corp., Kyoto, Japan

[21] Appl. No.: 368,802

[22] Filed: Jan. 5, 1995

[30] Foreign Application Priority Data

Jan. 5, 1994 [JP] Japan ................................. 6-011281

[51] Int. Cl.⁶ ................................................. C03C 10/16
[52] U.S. Cl. ............................. 501/3; 501/86; 65/33.3; 119/244
[58] Field of Search ....................... 501/3, 86; 65/33.3; 119/244

[56] References Cited

U.S. PATENT DOCUMENTS 3,839,055  10/1974  Grossman ........................... 501/3
4,652,312  3/1987  Grossman et al. ............... 501/3 X

FOREIGN PATENT DOCUMENTS 405284874  11/1993  Japan ................................ 119/244

*Primary Examiner*—Karl Group
*Attorney, Agent, or Firm*—Lowe, Price, LeBlanc & Becker

[57] ABSTRACT

An artificial nucleus made of a crystallized glass is provided for use in the production of a pearl. The crystallized glass has been produced using a batch having the following composition:

$SiO_2$ . . . 40–65 wt. %
$MgO$ . . . 3–16 wt. %
$MgF_2$ . . . 6.5–17 wt. %
$K_2O$ . . . 7.5–18 wt. %
$ZrO_2$ . . . 0.01–15 wt. %
$CaO$ . . . 0.1–20 wt. %
$P_2O_5$ . . . 0.1–20 wt. %
$BaO$ and/or $SrO$ . . . 0.1–13 wt. % and has crystalline phases composed primarily of tetrasilicon fluormica and formed in a glass matrix phase.

7 Claims, No Drawings

CRYSTALLIZED-GLASS-MADE ARTIFICIAL NUCLEUS FOR PEARL, PRODUCTION PROCESS OF THE ARTIFICIAL NUCLEUS, AND PEARL PRODUCED USING THE ARTIFICIAL NUCLEUS

BACKGROUND OF THE INVENTION a) Field of the Invention

This invention relates to a nucleus material for pearls, which permits production of high-quality pearls in a good yield.

More specifically, the invention is concerned with an artificial nucleus for a pearl, said artificial nucleus having been produced from a batch of a specific composition composed of oxides and a fluoride, containing crystalline phases composed primarily of tetrasilicon fluormica and formed in a glass matrix phase, and having excellent forming ability of pearl layers, i.e., nacreous layers, a production process of the artificial nucleus, and a pearl produced using the artificial nucleus.

b) Description of the Related Art

Pearls are physiologically produced within bivalves led by Akoya pearl oysters (*Pinctada fucara* (*Gould*)). In the case of cultured pearls, in particular, they are each produced by inserting into a mother oyster a piece (a small segment of the mantle of a mother oyster) and as a nucleus, a material chosen by human and then culturing the mother oyster for a predetermined period to have a substance formed as nacreous layers on a surface of the nucleus as a result of metabolic secretion by the mother oyster.

To produce peals of good quality in a high yield, it is therefore extremely important to choose an appropriate nucleus material (natural or artificial nuclei) for insertion into mother oysters.

Production of cultured peals requires a nucleus material which can meet such conditions as will be mentioned below.

(1) Economy-related conditions

The nucleus material has uniform quality and can be supplied in various sizes, in large quantity and at low price.

(2) Physiology-related conditions

When inserted into the bodies of mother oysters, the nucleus material is not supposed to cause any substantial problem in the metabolic secretion and the like of the mother oysters. More specifically, it is preferred to satisfy the following conditions:

(a) Good bio-activating property.

(b) Good surface smoothness.

(c) No bio-harmfulness.

The condition (a) is needed for the formation of nacreous layers in a short time, that is, for high productivity. On the other hand, the conditions (b) and (c), when met, led to the prevention of any harmful impetus to mother oysters or any reduction in the metabolic secreting function of the mother oysters, in other words, to the avoidance of death or denucleation (i.e., loss of nuclei) of the mother oysters and hence to the production of high-quality pearls in a good yield.

(3) Physical-property-relate conditions

The nucleus material is required to be excellent in the productivity of nuclei (i.e, the workability upon being worked or machined into true spheres, being surface finished and the like) and to permit production of pearls having excellent workability and superb adaptability as merchandise. More specifically, it is preferred to meet the following conditions:

(a) Good color shade and transparency:

The nucleus material to be employed is required to have uniform whitish translucence without a color or striped pattern and to permit production of peals free of localized excess luster which will occurs when a nucleus material having an uneven color or a high light transmission is used.

(b) Excellent structural properties

The nucleus material is required to be free of cleavage or cracks and, upon formation and working into nuclei, to permit ready formation into nuclei having high surface smoothness and true sphericity while assuring a good yield upon production of the nuclei and working of resulting pearls.

(c) Ability to produce pearls with excellent borability

Upon boring pearls in the production of a necklace or the like, the pearls are supposed to permit easy machining without cracking or flaking of their nacreous layers so that a high yield can be achieved.

(d) Ability to produce pearls with excellent chemical resistance

The resulting pearls should have good resistance to hydrogen peroxide, alcohols, ketons, hydrocarbon solvents and the like and, when subjected to destaining chemical treatment upon their working, should not develop any problem.

(e) Ability to produce pearls with excellent durability of commercial value

Nacreous layers should not undergo discoloration or embrittlement due to surrounding conditions or aging and should remain free from flaking, so that the pearls have high stability as merchandise.

(f) Ability to produce pearls having a specific gravity equal to those produced using natural nuclei In the distribution or transaction of pearls, the pearls are presently transacted in weight as a matter of fact. As a standard for their weight, the specific gravity of pearls obtained using natural nuclei (i.e., nuclei produced from shells of natural shell fish such as Tenshin freshwater mussel (*Lamprotula spp.*), namely, $2.85\pm0.10$ is adopted nowadays. It is therefore important to make artificial nuclei reflect this fact upon development of the artificial nuclei.

Needless to say, to furnish artificial nuclei for cultured pearls, it is therefore essential to develop a material which can meet the various conditions described above.

A description is now made of nucleus materials proposed to date for cultured pearls. At the dawn of pearl cultivation, use of a variety of materials was attempted, led by lead shotgun bullets, dried mullet roe, poppy seeds, hard paraffin, rosin and gutta-percha (natural rubber-like resin) and including silver, marble, coral, porcelain and the like. Since 1915 or so, natural nuclei made of shells have been considered to be most suited. As nuclei for cultured peals, natural nuclei obtained by grinding and polishing natural shells, which are in turn obtained from Tenshin freshwater mussel (*Lamprotula spp.*), into globules are still used widely these days.

It is however difficult to obtain nuclei of a uniform color shade and structure from natural shells. In addition, their size is limited by the thickness of the natural shells. It is therefore the current situation that nuclei of 10 mm or greater are practically not available. Moreover, Tenshin freshwater mussel (*Lamprotula spp.*) is on the decrease and is becoming smaller all over the world due to the overgathering to date, so that the nucleus material is increasingly becoming higher in price, smaller in diameter and lower in quality.

With the foregoing circumstances in view, attempts have been made, in the field of pearl culturing, to use as nuclei (artificial or synthetic nuclei) artificially-produced formed bodies in place of natural nuclei made from shells. As artificial nuclei of this sort, various artificial nuclei have been proposed as will be described below.

(1) Artificial nuclei making use of a synthetic resin

Artificial nuclei made of a synthetic resin have a uniform color shade and can be supplied in various sizes, in large quantity and at low price. They however involve may problems such as the toxicity to the bodies of mother oysters, the difficulty in boring upon working of pearls, the poor resistance to destaining chemical treatment, the susceptibility of nacreous layers to discoloration, embrittlement and/or flaking due to surrounding conditions or aging, and the difference in specific gravity. Accordingly, the National Federation of Pearl Cultivators Cooperated Association banned transaction of pearls making use of such nuclei in September, 1958.

(2) Artificial nuclei, namely, so-called kneaded nuclei obtained using a material formed of a synthetic resin and various fillers including shell powder mixed therein For example, Japanese Patent Application Laid-Open (Kokai) No. SHO 48-52594 proposed a production process of artificial nuclei for cultured peals, which have a desired diameter of 10 mm or smaller and a smooth spherical surface. According to the process, 10 parts of a waterproof adhesive or a waterproof synthetic resin are added to 10–50 parts of powder of precipitated light calcium carbonate obtained by chemical treatment, and the resultant mass is granulated.

In the above-described proposal of synthetic resin nuclei, it is stated that such synthetic resin nuclei permit easier boring upon working pearls and use of a resin having low toxicity can improve the toxicity to mother oysters.

In pearls obtained using such a kneaded nucleus, their nacreous layers are prone to flaking due to aging and temperature fluctuations over years and upon boring, the nacreous layers tend to develop cracks. According to Japanese Patent Application Laid-Open No. (Kokai) No. SHO 63-219325, in particular, the above problems have been found to be attributed to the coefficient of linear expansion of the nucleus material. This patent publication indicates that such problems can be overcome by controlling the coefficient of linear expansion of a nucleus material within a range of $0.5–2.0\times10^{-5}/°$ C.

(3) Artificial nuclei proposed recently and making use of a ceramic material

Japanese Patent Application Laid-Open (Kokai) No. SHO 60-259135, for example, discloses a culturing method of colored pearls. This method uses, as artificial nuclei, formed bodies which have a globule size of 20 mm or smaller and have been obtained by mixing 20–100 wt. % of powder having a particle size of 0.1–105 µm and selected from pearl powder, coral powder or shell powder of a crustacea, 0–80 wt. % of calcium carbonate having a particle size of 1–100 µm and 0–20 wt. % of an inorganic pigment and then forming the resultant mixture at 400°–1500° C. and elevated pressure.

Further, Japanese Patent Publication (Kokoku) No. HEI 2-12537, in view of the limited availability of resources for natural nuclei and limitations in characteristics, discloses a nucleus material for pearls, which is composed of a free-cutting crystallized glass having a Knoop hardness number of 50–250.

The proposal of Japanese Patent Publication (Kokoku) No. HEI 2-12537 referred to above is to use a free-cutting crystallized glass as a nucleus material for pearls with a view toward ensuring stability in supply and uniformity in quality and achieving an improvement in chemical resistance and machinability.

Described more specifically, the above-described proposal discloses the following illustrative examples of the free-cutting crystallized glass:

(i) anisotropic, crystallized glasses each obtained by melting compounds of mica component elements, such as aluminum, magnesium, alkali metals, fluorine and boron, together with silicon dioxide and heat-treating the melt to allow fine crystals of a synthetic mica to grow at random in a glass so that the crystallized glass is formed of a glass and a ceramic;

(Note) The above proposal specifically discloses as the above-described crystallized glass "MACOAL" (trade mark; product of Corning, Inc., U.S.A.).

(Note) From the above description, the exact composition of the crystallized glass is unknown. The present inventors however believe that the composition of the above-described crystallized glass and the structure of its crystalline phases are of the same kinds as those disclosed in U.S. Pat. Nos. 3,689,293 and 3,732,057 and Japanese Patent Application Laid-Open (Kokai) No. SHO 62-7649. A description will be made subsequently herein about the structure of the crystalline phases of the crystallized glass.

(ii) crystallized glasses each obtained by dry pressing with a calcium compound such as calcium silicate or calcium phosphate, a magnesium compound and the like being contained in large amounts, followed by firing; and also discloses, as preferred examples:

(iii) free-cutting, crystallized glasses having an $SiO_2$ content not greater than 50 wt. % and having a Knoop hardness number not greater than 20.

SUMMARY OF THE INVENTION

Despite of the above-described proposals of various materials as artificial nuclei, it is the current situation that pearls making use of these artificial nuclei are practically not available on the market. Although natural nuclei are accompanied by various problems as described above, it is the current situation that natural shells are still used as nuclei for cultured pearls because of the lack of any nucleus material better than such natural nuclei.

As a reason for the current situation described above, the present inventors consider that the above-described wide variety of requirements for nucleus materials have not been met technically to sufficient extent in the development of artificial nuclei materials, although it can certainly be attributed in part to the fact that nuclei made from shells (natural nuclei) are still abundantly available and involve no problem in price.

The present inventors believe that the biggest unsolved technical theme in using artificial nuclei resides in how to maintain the nacreous-layer-forming speed (ability) at a high level while taking bio-intoxicity and bio-activating property into due consideration.

To achieve the above theme, the present inventors consider that mutual relations between an artificial nucleus to be employed and the biosystem of a mother oyster must be thoroughly studied instead of placing importance on mere mechanical properties of the artificial nucleus, for example, the machinability (borability) described above under the description of the related art.

As will be described subsequently herein, the present invention is to attain the above-described biggest theme based on the composition and crystalline structure of a crystallized glass, namely, by allowing metal ions such as calcium ions and phosphorus ions to be actively dissolved out into the biosystem of a mother oyster so that the nacreous-layer-forming ability can be enhanced.

The biggest characteristic feature of an artificial nucleus of this invention for a pearl therefore resides in the adoption of a crystallized glass which has been obtained from a batch of oxides and a fluoride in a specific composition and contains crystalline phases composed primarily of tetrasilicon fluormica and formed in a glass matrix phase so that metal ions as bio-activating factors, such as calcium ions and phosphorus ions, can be rendered easier to be dissolved out.

The artificial nucleus of this invention for a pearl is an artificial nucleus for a pearl, which can satisfy various property requirements, to say nothing of the nacreous-layer-forming ability.

Artificial nuclei according to this invention for pearls permit use of one of various conventional pearl culturing methods as is, and also allows production of high-quality pearls with a thick nacreous layer of good quality in a good yield in a short time.

In one aspect of the present invention, there is thus provided an artificial nucleus for a pearl. The nucleus is made of a crystallized glass. The crystallized glass has been produced using a batch of the following composition:

$SiO_2$ ... 40–65 wt. %
$MgO$ ... 3–16 wt. %
$MgF_2$ ... 6.5–17 wt. %
$K_2O$ ... 7.5–18 wt. %
$ZrO_2$ ... 0.01–15 wt. %
$CaO$ ... 0.1–20 wt. %
$P_2O_5$ ... 0.1–20 wt. %
$BaO$ and/or $SrO$ ... 0.1–13 wt. % and has crystalline phases composed primarily of tetrasilicon fluormica and formed in a glass matrix phase.

In another aspect of the present invention, there is also provided a process for the production of artificial nuclei for pearls. The nuclei being made of a crystallized glass. The process comprises:

providing, as a batch for the crystallized glass, a batch composed of oxides and a fluoride and having the following composition:

$SiO_2$ ... 40–65 wt. %
$MgO$ ... 3–16 wt. %
$MgF_2$ ... 6.5–17 wt. %
$K_2O$ ... 7.5–18 wt. %
$ZrO_2$ ... 0.01–15 wt. %
$CaO$ ... 0.1–20 wt. %
$P_2O_5$ ... 0.1–20 wt. %
$BaO$ and/or $SrO$ ... 0.1–13 wt. %;

melting the batch into an uncrystallized glass; and heat-treating the uncrystallized glass so that crystalline tetrasilicon fluormica phases having an average particle size of 2–15 μm are formed to at least 40%, based on the weight of the crystallized glass, in a glass matrix phase. When the crystalline tetrasilicon fluormica phases having the average particle size of 2–15 μm have been formed to at least 40%, based on the weight of the crystallized glass, in the glass matrix phase, the glass matrix phase accounting for at most 60% of the weight of the crystallized glass preferably has the following composition:

$SiO_2$ ... 25–75 wt. %
$MgO$ ... 0–20 wt. %
$F$ ... 0–12 wt. %
$K_2O$ ... 5–30 wt. %
$ZrO_2$ ... 5–35 wt. %
$CaO$ ... 0.1–40 wt. %
$P_2O_5$ ... 0.1–40 wt. %
$BaO$ and/or $SrO$ ... 0.1–20 wt. %.

In a further aspect of the present invention, there is also provided a pearl obtained by inserting into a mother oyster the artificial nucleus according to the first aspect of the present invention, and then culturing the mother oyster to form nacreous layers on a surface of the artificial nucleus.

DETAILED DESCRIPTION OF THE INVENTION AND PREFERRED EMBODIMENTS

To facilitate the understanding of the present invention, a description will first be made of a course of developments which has led to the present invention.

The present inventors considered that a nucleus material, which enables the formation of thick nacreous layers of good quality in a high yield in a short time, is a material which, when inserted in a mother oyster, can activate the metabolic secretion of the mother oyster, in other words, a material good in the so-called bio-activating property.

Under the above-described belief, the present inventors conducted a wide range of experiments. The results of those experiments are shown as substantiating data in comparative examples which will be described subsequently herein.

First, the present inventors were interested in crystallized glasses composed primarily of $CaO$ and $P_2O_5$ (primary crystalline phases: oxidized apatite or fluorapatite) and suitable for use in the production of bio-active artificial bones or artificial dental elements such as artificial tooth roots as disclosed, for example, in Japanese Patent Publication (Kokai) No. SHO 51-8970 and Japanese Patent Laid-Open (Kokai) Nos. SHO 51-73019, 57-191252, 60-131849 and 62-72540 (which corresponds to U.S. Pat. No. 4,783,429).

Those materials were formed into globules and inserted as artificial nuclei into the bodies of mother oysters, and the mother oysters were then cultured. As a result, it was found that the artificial nuclei can form thick nacreous layers of good quality in a high yield in a shorter time compared with conventional natural nuclei. Incidentally, those artificial nuclei were unable to fully satisfy the wide range of properties required as artificial nuclei for pearls as will be shown in Comparative Examples 6(f) to 7(f) which will be described subsequently herein.

As reasons for the above-described finding, the present inventors consider that like the bio-activating property (biocompatibility) observed when the above-described artificial bone is inserted in the human body, ions led by $Ca^{2+}$ ions are also dissolved out in amounts, which are trace but are sufficient for the formation of nacreous layers in an initial period after the insertion, more promptly from the glass matrix of the crystallized glass in the body of each mother oyster than from the conventional natural nuclei and also that these ions become over-saturated in the gonad of the nucleus-inserted mother oyster and promptly deposit on the thus-inserted nucleus materials, thereby forming nacreous layers in a short time. This theory is supported by the fact that $Ca^{2+}$ ions are also dissolved out from conventional natural nuclei. It is also evident that in the above-described materials, ions other than $Ca^{2+}$ ions are also effective for the formation of nacreous layers in the initial period after the insertion.

In the case of conventional kneaded nuclei and nucleus materials making use of a ceramic having no bio-activating property, cracks or flaking occurs in nacreous layers upon boring. In the case of the above materials, however, neither cracks nor flaking occurs. This can probably be attributed to the possibility of firm bonding between each artificial nucleus and nacreous layers owing to the mechanism of formation of the nacreous layers.

The present inventors next tested the free-cutting crystallized glass materials disclosed in Japanese Patent Publication (Kokoku) No. HEI 2-12537 referred to above and having a Knoop hardness number of 50–250.

As has been described above, Japanese Patent Publication (Kokoku) No. HEI 2-12537 discloses crystallized glasses obtained by dry-pressing and firing glass components with calcium compounds such as calcium silicate and calcium phosphate and a magnesium compound included in large amounts. Although their exact compositions are not known, samples were produced and tested. As a result, their nacreous-layer-forming ability was found to be much inferior compared with artificial nuclei according to the present invention. This means that the free-cutting crystallized glass materials hardly allow ions to be dissolved out in the gonads of mother oysters in amounts sufficient for the formation of nacreous layers in an initial period after their insertion and are hence not effective for the formation of nacreous layers in a short period (see Comparative Example 4, which will be described subsequently herein).

In free-cutting crystallized glasses such as "MACOAL" of Corning, Inc., U.S.A. disclosed in Japanese Patent Publication (Kokoku) No. HEI 2-12537 (also see U.S. Pat. No. 3,689,293) and "MACERITE" (trade mark) and "MACERITE SP" (trade name), (products of MITSUI MINING CO., LTD.) similar to "MACOAL" [techniques relevant to them are disclosed in Japanese Patent Laid-Open (Kokai) Nos. SHO 62-7649 and HEI 1-115848], their principal crystalline phases are formed of fluorophlogopite and do not contain elements capable of being dissolved out as bio-activating ions such as $Ca^{2+}$ ions. Compared with the conventional natural nuclei, these free-cutting crystallized glasses have poorer nacreous-layer-forming ability. Further, those containing crystalline phases of the above-described fluorophlogopite do not permit transmission of light therethrough and are not considered to be suited for pearls (see Comparative Example 4).

From the foregoing, it can therefore be concluded that Japanese Patent Publication (Kokoku) No. HEI 2-12537 discloses nothing more than free-cutting crystallized glasses with a Knoop hardness number specified merely in view of machinability.

The above-described crystallized glasses which were tested by the present inventors and contain CaO and $P_2O_5$ as principal components have bio-activating property so that they have good nacreous-layer-forming ability. They however have Vickers hardness as high as about 600 or greater and flexural strength as high as 1200 $kgf/cm^2$, so that they can hardly be bored. In addition, most of them have a specific gravity of 3.00 or higher and many of them have an unclear color shade. They hence cannot satisfy the conditions for artificial nuclei for pearls.

As a next step, the present inventors were interested in and tested mica-base crystallized glasses (principal crystalline phases: tetrasilicon mica) for construction materials or dental materials, which are disclosed as having excellent machinability and translucence in U.S. Pat. Nos. 3,732,087, 4,431,420 and 4,652,312, Japanese Patent Laid-Open (Kokai) No. HEI 5-194132, etc. Namely, these materials were formed into globules and inserted as artificial nuclei in the bodies of mother oysters, and the mother oysters were then cultured.

As a result, it was found that as these materials are inherently free of $Ca^{2+}$ ions like "MACOAL" of Corning, Inc., U.S.A., they had poorer nacreous-layer-forming ability than the conventional natural nuclei as expected. Further, these materials have Vickers hardness as high as about 400 and flexural strength as high as 1500 $kgf/cm^2$, so that they are not suited as nuclei for pearls from the standpoint of boring. In addition, most of them have a specific gravity of 2.70 or lower and cannot satisfy the conditions required to permit their use as artificial nuclei (see Comparative Example 5, which will be described subsequently herein).

In view of the test results described above, the present inventors were then interested as a next step in mica-base crystallized glasses which had excellent machinability and a translucent color shade and were different from the above-described mica-base crystallized glasses. Namely, CaO and $P_2O_5$ components were added as bio-activating property imparting components to mica-base crystallized glasses, whereby the micabase crystallized glasses were provided with a function to activate the metabolic secretion of mother oysters. It was then tested if the resulting mica-base crystallized glasses would be able to form thick nacreous layers of good quality in a good yield in a shorter time than the conventional natural nuclei.

The above-described mica-base crystallized glasses include, as dental crystallized glasses, those disclosed in Japanese Patent Laid-Open (Kokai) Nos. SHO 62-108750, HEI 2-149447, HEI 2-153839, HEI 2-153840 and HEI 2-153841. These dental crystallized glasses contain the above-described bio-activating components such as CaO and $P_2O_5$.

As a result, the above-described mica-base crystallized glasses had a poor color shade or poor borability as nuclei for pearls and had a specific gravity of about 2.70 or lower. Accordingly they were not found to satisfy the conditions required to permit their use as artificial nuclei (see Comparative Example 8, which will be described subsequently herein).

The present invention has been completed as a result of research, which was conducted on the basis of such a mica-base crystallized glass as those described above, with a view toward obtaining a mica-base crystallized glass containing CaO and $P_2O_5$ and having easy borability as nuclei for pearls, a specific gravity of about 2.85±0.1 and good bio-activating property while retaining the translucent color shade. The present invention therefore provides an artificial nucleus for a pearl, said artificial nucleus being made of a crystallized glass and having a specific crystallized glass composition and crystalline structure satisfying all the conditions required for artificial nuclei for pearls, a production process of the artificial nucleus, and a pearl obtained using the artificial nucleus. The above-described technical features of the present invention will hereinafter be described in further detail.

The present inventors have proceed with extensive research with a view toward providing a mica-base crystallized glass which contains CaO and $P_2O_5$ having good bio-activating property and also satisfies other properties required as an artificial nucleus.

As a result, it has been ascertained that components capable of releasing bio-activating ions such as CaO and $P_2O_5$ have to be caused to exist in a glass matrix phase in order to enhance the bioactivity, mica crystalline phases formed in the matrix phase of the crystallized glass and their particle size and the composition of the glass matrix phase (amorphous glass phase) associated with the mica crystallized phases have the important key to the development and maintenance of a translucent color shade suitable as nuclei for pearls, the particle size and crystallinity of the mica crystalline phases have the important key for the facilitation of boring work of nuclei for pearls, and the compositions of the mica seed crystal and the glass matrix phase have an important key for the control of the specific gravity to 2.85±0.10 or so.

Namely, it has been ascertained preferable for the maintenance of a translucent color shade suited for a nucleus material for pearls that the average particle size of mica crystal particles in the mica-base crystallized glass is 15 μm or smaller and the crystalline phases are crystalline phases of tetrasilicon fluormica, because this makes it easier to make the refractive index of the glass matrix phase closer to that of he tetrasilicon fluormica crystalline phases. It has also been found that control of an average particle size of crystalline mica particles to 15 μm or smaller makes it possible to obtain better surface smoothness when the nucleus material is formed into a spherical shape (i.e., worked into a true sphere).

Where it is desired to improve the cutting workability of a crystallized mica glass, there is generally adopted the approach that as is also disclosed in the above-described known publications, mica crystals stated to have low hardness are caused to grow to a large size (i.e., to obtain large crystals). This approach is however not preferred from the standpoint of maintenance of a surface smoothness and a translucent color shade of the above-described material.

Japanese Patent Application Laid-Open (Kokai) No. HEI 5-194132 referred to above, on the other hand, discloses a mica-based crystallized glass with many small crystals formed for the maintenance of a translucent color shade and crystallinity increased for the improvement of cutting machinability. Although this approach can improve the cutting machinability because the hardness of the material is rendered relatively low by increasing the crystallinity despite the crystals are small, the flexural strength or rupture toughness of the material is increased and the borability (cutting machinability) of the resulting pearls is hence conversely deteriorated.

The present inventors have empirically ascertained the fact that to permit high cutting machinability, a material must have a low hardness as its physical property and moreover the magnification product of its hardness and its flexural strength or the magnification product of its hardness and its rupture toughness as its physical properties must be low. This means that when the cutting machinability (cut weight) is plotted along the axis of ordinates and the magnification production of the hardness and the flexural strength (or the magnification product of its hardness and its rupture toughness) is plotted along the axis of abscissas, they are correlated by a curve (line) descending rightwards.

The present inventors have also ascertained that in a mica-base crystallized glass, control of the average particle size of crystalline mica particles to 2 μm or greater leads to a reduction in both its hardness and its flexural strength or rupture toughness. They have also found that control of its crystallinity to 40% by weight makes it possible to obtain cutting machinability suited for the boring of pearls.

As has been described above, it is an important characteristic for cultured pearls that the pearls as products to have the same specific gravity (2.85±0.10) as pearls obtained using natural nuclei.

To control the specific gravity of cultured pearls at 2.85 or so, it is necessary to increase the specific gravity of at least one of the crystalline mica phases and the glass matrix phase. A component to be added for this purpose should be chosen while fully considering that this additional component should not give any significant influence to the growth of crystals upon production of a crystallized glass, should be free of toxicity and should not impair the important characteristics as pearls such as the translucent color shade.

In the present invention, the above-described requirements have been met by using a specific-gravity-controlling component having a high molecular weight typified by BaO or SrO.

Putting together all the matters described above, the crystallized-glass-made artificial nucleus of this invention for a pearl is composed of a mica-base crystallized glass which contains, in addition to the components of $SiO_2$, MgO, $MgF_2$, $K_2O$ and $ZrO_2$, CaO and $P_2O_5$ as components for imparting bio-activating property and a component having a high molecular weight such as BaO or SrO as a specific-gravity-controlling component and also contains crystalline phases formed primarily of tetrasilicon fluormica. Upon production of the above-described crystallized glass, the production is controlled so that crystalline phases having an average particle size of 2–15 μm and composed of tetrasilicon fluormica are formed to 40% by weight or higher in a glass matrix phase and the refractive index of the glass matrix phase becomes close to that of the crystalline phases of tetrasilicon fluormica. These have made it possible to obtain a crystallized glass which can satisfy all the properties required for artificial nuclei for pearls.

In a production process of the crystallized-glass-made artificial nuclei of this invention for pearls, said artificial nuclei being composed of the above-described specific components and having the above-specified crystalline structure, the crystallization step can be conducted in a manner to be described below.

By heat-treating at a high temperature a molten glass as a mother glass for the mica-based crystallized glass, the atoms in the glass are allowed to move and $Mg^{2+}$ ions and $F^-$ ions begin to align to lower the free energy. Crystalline phases that are formed first have been found to be made sellite ($MgF_2$) by the X-ray powder method.

When the heating is continued further, Si, Mg, K and O atoms which are present abundantly around the sellite crystals align around the sellite crystals as nuclei and grow into mica crystals. The manner of the above-described alignment of elements is consistent with the observation result that X-ray diffraction peaks corresponding to sellite crystals disappeared.

When CaO and $P_2O_5$ components are included at relatively high contents in the present invention, $Ca^{2+}$ ions and $F^-$ ions first begin to align upon heat treatment. Crystalline phases which are first formed are formed of fluorite ($CaF_2$). When the heating is continued further, Ca and P elements or Si, Mg, K and O elements which are present abundantly around fluorite crystals align around the fluorite crystals as nuclei, so that they grow into crystals of fluorapatite or calcium mica and the fluorite crystals disappear. Namely, the crystallized-glass-made artificial nucleus of this invention for a pearl is primarily composed of crystalline phases of tetrasilica fluormica and also contains the above-described crystalline phases of fluorapatite and the like.

In relation to the crystallization step described above, a description will next be made of a method for controlling the particle sizes of mica crystals in the mica-base crystallized glass to relatively small ones, for example, to an average particles size of 2–15 µm in the present invention.

As a method for controlling the particle sizes of the above-described crystals, the following method cay be adopted for example:

(1) The amount of F should be increased relative to the whole MgO in the glass as a mother glass for the mica-based crystallized glass. Especially, $MgF_2$ is incorporated at a high content so that a composition capable of forming many sellite crystals as nuclei for the formation of mica crystals is adopted.

(2) As a control to the growth of mica crystals, $SiO_2$ and $ZrO_2$ components are added so that the movement of elements in a glass which becomes a mother glass for a mica-base crystallized glass can be controlled. This is to control by $SiO_2$ and $ZrO_2$ the viscosity of the glass matrix around mica crystals, said viscosity varying from time to time during formation of mica crystals. Further, the addition of $ZrO_2$ can improve the chemical resistance of the glass matrix and can also prevent surface and internal heterocrystallization by enstatite ($MgSiO_3$). In addition, the addition of $ZrO_2$ controls the refractive indices of the glass matrix phase and the formed crystalline phases so that the translucence of the material is retained.

In the production process of the crystallized-glass-made artificial nuclei of this invention for pearls, it is only necessary, as a method for improving the crystallinity, to form many sellite crystals which act as nuclei for the formation of mica crystals. For this purpose, it is necessary to increase the content of F relative to the whole MgO in the glass as a mother glass for the mica-base crystallized glass, and also to add $SiO_2$ and $ZrO_2$ and to bring the contents of $SiO_2$, MgO and $K_2O$, the components of mica crystals, into conformity with the element ratio of tetrasilicon fluormica crystals, i.e., $KMg_{2.5}Si_4O_{10}F_2$. As a method for controlling the refractive index of the glass matrix other than the crystallized portions, it is important to control the composition of the glass matrix phase so that the refractive index of the glass matrix becomes close to that of crystals of tetrasilicon fluormica.

In the production process of the crystallized-glass-made artificial nuclei of this invention for pearls, a batch has such a glass composition as will be described next.

Namely, the composition of the crystallized glass according to the present invention is as follows:

$SiO_2$ . . . 40–65 wt. %

MgO . . . 3–16 wt. %

$MgF_2$ . . . 6.5–17 wt. %

$K_2O$ . . . 7.5–18 wt. %

$ZrO_2$ . . . 0.01–15 wt. %

CaO . . . 0.1–20 wt. %

$P_2O_5$ . . . 0.1–20 wt. %

BaO and/or SrO . . . 0.1–13 wt. %

If the content of $SiO_2$ is lower than 40 wt. % in the above-described composition of the crystallized glass according to the present invention, the viscosity of the glass become lower so that the particle sizes of crystals can hardly be controlled to 15 µm or smaller and the chemical resistance of the matrix glass phase is extremely deteriorated. $SiO_2$ contents greater than 65 wt. %, on the other hand, lead to formation of more heterocrystals such as cristobalite, so that the translucence is impaired and at the same time, the viscosity of the glass is increased, thereby making it difficult to control the particle sizes of crystals to 2 µm or greater.

If the content of MgO is lower than 3 wt. % in the above-described composition, the crystallinity is lowered and the hardness is increased, so that the workability is impaired. If the content of MgO is greater than 16 wt. %, enstatite crystals are formed upon crystallization so that the translucent color shade is impaired.

If the content of $MgF_2$ becomes lower than 6.5 wt. % in the above composition, it becomes difficult to control the reduction in crystallinity and the particle sizes of crystals, whereby the workability is impaired. This also leads to the formation of heterocrystals such as enstatite crystals in a large amount, so that the color shade is impaired. If the content of $MgF_2$ exceeds 17 wt. %, on the other hand, the devitrification property of the glass is increased, thereby making it difficult to control the formation of crystals.

If the content of $K_2O$ is smaller than 7.5 wt. % in the above composition, the refractive index of the glass matrix phase is changed so that the color shade is impaired and in some instances, the crystallinity is also lowered. If the content of $K_2O$ is greater than 18 wt. %, the chemical resistance of the matrix glass phase is deteriorated and moreover, phenocrystalic crystals are formed, thereby making it difficult to control the particle sizes of crystals.

If the content of $ZrO_2$ becomes lower than 0.01 wt. % in the above composition, it becomes difficult to control crystals to be formed so that the chemical resistance is impaired and the maintenance of translucence becomes difficult. $ZrO_2$ contents higher than 15 wt. %, on the other hand, lead to a reduction in the crystallinity of mica crystals.

In the present invention, the control of growth of crystals can be achieved by the combination of the $ZrO_2$ component and the $SiO_2$ content. Accordingly, in relation to the amount of the $SiO_2$ component to be used, it is possible to substantially reduce the amount of the $ZrO_2$ component to be employed.

If the content of CaO or $P_2O_5$ is lower than 0.1 wt. % in the above-described composition, the nacreous-layer-forming ability is impaired. If the content of CaO or $P_2O_5$ is higher than 20 wt. %, on the other hand, fluorapatite crystals and calcium mica crystals which are large in particle size are formed, thereby making it difficult to control the particle size and also to retain the translucent color shade.

In the above-described composition, BaO and SrO are added to adjust the specific gravity of the resulting pearls to the specific gravity (2.85±0.10) of cultured pearls obtained using the conventional natural nuclei. This specific-gravity-controlling material is preferably one not affecting the other properties of the cultured pearls so produced, and BaO or StO is used as described above.

When BaO is used as a specific-gravity-controlling material, for example, BaO contents smaller than 0.1% result in a specific gravity smaller than the desired specific gravity of 2.85±0.10. BaO contents higher than 10%, on the other hand, conversely lead to a specific gravity greater than 2.85±0.10 and moreover, form barium mica crystals in a large amount so that the strength and rupture toughness are increased, the workability is deteriorated and the translucence of the color shade is lost.

The crystallized glass used for the artificial nuclei of this invention for pearls presents a uniform, translucent, milky white color shade, and its quality is very close to those of natural nucleus materials. Needless to say, like the colored pearls disclosed in Japanese Patent Application Laid-Open (Kokai) No. SHO 60-259135, coloration of the above-described material according to the present invention can provide colored pearls. As a coloring method, at least one transition metal oxide, noble metal oxide, halide or salt such as $Fe_2O_3$, Au, $Co_2O_3$, $MnO_2$ or the like can be added as a coloring material to the composition for the crystallized glass.

When a coloring material is added, it is preferred to limit the amount of the coloring material to 10 wt. % per 100 wt. % of the whole glass composition. If the coloring material is added in an amount greater than 10%, the coloration becomes too deep and the crystallization characteristic is affected, leading to a reduction in the crystallinity and hence a reduction in physical properties. Use of the coloring material in such large amounts is therefore not preferred.

The crystallized glass employed in the artificial nucleus of this invention for a pearl permits, to a total amount of 10 wt. %, addition of components other than the components described above, for example, the oxide of an alkali metal or an alkaline earth metal compatible with crystals of tetrasilicon fluormica crystals and a transition metal effective in controlling the property of the matrix glass phase. For example, inclusion of $Al_2O_3$ results in the conversion of tetrasilicon fluormica crystals to fluorphlogopite [$KMg_3(AlSi_3O_{10})F_3$] crystals in the crystallized glass according to the present invention. Absolutely no problem is caused insofar as its amount is not large. Inclusion of $Na_2O$ or $Li_2O$ is however not preferred because swelling mica crystals are formed and the chemical resistance and the light transmitting property are deteriorated.

The crystallized glass useful for the artificial nuclei of this invention for pearls can be produced in the manner to be described next. The following production process should therefore be interpreted as illustrative and the present invention is not limited at all by it.

Namely, oxides, carbonates and a fluoride in amounts sufficient to provide the above-described composition —which comprises 40–65 wt. % of $SiO_2$, 3–16 wt. % of MgO, 6.5–17 wt. % of $MgF_2$, 7.5–18 wt. % of $K_2O$, 0.01–15 wt. % of $ZrO_2$, 0.1–20 wt. % of CaO, 0.1–20 wt. % of $P_2O_5$ and 0.1–13 wt. % of BaO and/or SrO—are molten at 1300° C. to 1550° C. for 2–6 hours in a lidded platinum crucible to obtain an amorphous glass (this process will hereinafter be called the "oxide melting method").

Next, the melt is poured into molds to produce molded bodies, which are then subjected to heat treatment so that a crystallized glass useful in the production of artificial nuclei of the present invention can be produced.

As a preferred embodiment of the above-described heat treatment method practiced in the present invention, it is only necessary to choose heat treatment conditions which are suited for the formation of tetrasilicon fluormica crystals having an average particle size of 2–15 μm in the crystallized glass.

To uniformly form tetrasilicon fluormica crystals having an average particle size of 2–15 μm in the glass matrix phase in the present invention, it is necessary to form fine crystal nuclei sufficiently and then to allow them to grow to crystals having a particle size of 2–15 μm.

In the present invention, conditions for the formation of the above-described crystal nuclei include 550°–750° C. (a range up to a temperature somewhat higher than the glass transition point) and the holding time at that temperature is preferably 0–5 hours, because the speed of formation of crystal nuclei closely relies upon the temperature, namely, the viscosity of the glass and a high temperature makes it possible to complete the formation of crystal nuclei in a short time but a low temperature requires a long time. When a high temperature is employed, high CaO and $P_2O_5$ contents cause formation of fluorapatite crystals having a coarse particle size and loss of translucence. It is therefore necessary to pay attention to the holding time.

To form crystal nuclei in the present invention, oxides, carbonates and a fluoride in the specific composition described above are molten as a batch to form an amorphous glass, which is then formed in desired molds. The heat treatment of the bodies so formed can be heat-treated by one of two methods, which are (1) to form crystal nuclei in the course of cooling at temperatures higher than the glass transition point and then subject the bodies to heat treatment for the growth of crystals and (2) to cool the bodies to a temperature lower than the glass transition point and then to heat them again so that crystal nuclei are formed and crystals are then allowed to grow.

In the method (1), no heat treatment is needed for the formation of crystal nuclei when in the course of cooling, the cooling speed below 750° C. is set at a mild speed such as 5° C./min or less. In the method (2), no heat treatment is required for the formation of crystal nuclei when the heating from the glass transition is conducted at a mild speed such as 5° C./min or less.

Then to allow the crystal nuclei to grow to mica crystals of 2–15 μm in average particle size, heat treatment is continued at a high temperature. The speed of growth of these crystals is also dependent on the temperature, namely, the viscosity like the speed of formation of the crystal nuclei. Since the growth of crystals is completed by the maintenance of heat in a short time when the temperature is high but a long time is needed at low temperatures, the temperature and the heat treatment time can be selected from a temperature range of 600°–1200° C. and a heat treatment time of 1–6 hours as needed.

To allow crystals to grow to a particle size of 2–15 μm on average, 600°–1200° C. and 1–6 hours are therefore temperature and holding time ranges preferred as heat treatment conditions.

Needless to say, even if microcrystals containing fluorapatite or a small amount of other crystals are formed together with tetrasilicon fluormica crystals at the time of the above heat treatment, they cause no problem.

The crystallized glass according to the present invention, which has the above-described composition, is intended for use as artificial nuclei for pearls. As they are inserted in the bodies of mother oysters and a clear color shade is strongly required, impurities must be reduced as much as possible. For this purpose, the batch must be selected carefully. As one method for the selection of the batch, it is preferred to use the below-described sol-gel method.

Using as components corresponding to the oxide components in the composition described above, metal alkoxides such as $Si(OC_2H_5)_4$, $Mg(OCH_3)_2$, $KOCH_3$, $Zr(O\text{-}i\text{-}C_4H_9)_4$, $Ca(OC_2H_5)_2$, $PO(OCH_3)_3$ and $Ba(OC_2H_5)_2$ and a fluorine-containing compound such as $NH_2C_6H_4CF_3$ are mixed and dissolved in a solvent such as a polar solvent in proportions so that when converted to oxides and a fluoride, the following composition will be provided: 40–65 wt. % of $SiO_2$, 3–16 wt. % of MgO, 10–18 wt. % of $K_2O$, 0.1–15 wt. % of $ZrO_2$, 8–17 wt. % of $MgF_2$, 0.1–20 wt. % of CaO, 0.1–20 wt. % of $P_2O_5$, and 0.1–10 wt. % of BaO and/or SrO. Water is added to the resulting mixture and the pH is changed to an alkaline side. After hydrolyzing, the mixture so obtained is dewatered and dried so that a desired glass batch can be produced. By melting the glass batch so produced, an amorphous glass is obtained. After forming the amorphous glass into a predetermined shape, the bodies so formed are heat treated in the temperature range of 600°–1200° C. for 1–6 hours as described above so that tetrasilicon fluormica crystals having an average particle size of 2–15 µm can be formed under control.

This method can produce a bio-activating material containing impurities in an extremely small amount than the former method, that is, the sol-gel method making use of metal alkoxides as starting materials for oxides. Further, this method can provide a glass having a low melting temperature, thereby bringing about the merit that the energy consumption is small.

A production process making use of the above described sol-gel method will be described specifically.

For example, 101.28 parts of silicon tetraethoxide [$Si(OC_2H_5)_4$], 13.95 parts of magnesium dimethoxide [$Mg(OCH_3)_2$], 5.66 parts of potassium methoxide ($KOCH_3$), 0.16 part of zirconium tetrabutoxide [$(Zr(O\text{-}i\text{-}C_4H_9)_4]$], 1.12 part of calcium diethoxide [$Ca(OC_2H_5)_2$], 0.95 part of phosphoric trimethoxide [$PO(OCH_3)_3$] and 7.43 parts of barium diethoxide [$Ba(OC_2H_5)_2$] are dissolved in 1500 parts of ethanol. The resulting solution is added to and mixed with a solution of 12.61 parts of 3-aminobenzotrifluoride ($NH_2C_6H_4CF_3$) in 500 parts of benzene. Water which has been adjusted to pH 11 with ammonia is then added dropwise (about 200 parts). When the solution has completely turned to a white gel, the gel is dried at 120° C. and then heat-treated (at about 700°–950° C. or 1000°–1300° C.) to produce a mother glass.

After melting the mother glass, it is rendered morphous and also formed into a desired shape. The formed bodies so obtained are then subjected to heat treatment for crystallization so that the amorphous glass is converted to a tetrasilicon-fluormica-base crystallized glass.

In the sol-gel method described above, it is preferred to use alkoxides having a $C_1$–$C_4$ alkyl group as metal alkoxide compounds. Any fluorine-containing compound can be used insofar as it is soluble in a polar solvent. 3-Aminobenzotrifluoride ($NH_2C_6H_4CF_3$) is sparingly soluble in alcohols and ketones so that it can be dissolved in benzene, a non-polar solvent. It is preferred to use 5–13 l (liters) of a polar solvent per kg of a mother glass to be produced.

For the hydrolysis in the above-described sol-gel method, it is preferred to use water, which is required for the hydrolysis of each alkoxide, in an amount 2–12 times the theoretical amount. Although the velocity of the hydrolysis varies from one alkoxide component to another, use of water in the above-described amount makes it possible to obtain a relatively uniform gel. Use of water in an amount outside the above range results in a non-uniform gel and is therefore not preferred.

The pH at the time of the hydrolysis is preferably 6.0 or higher in general. A pH value lower than 6.0 result in a slow speed of hydrolysis so that a nonuniform gel is formed. Further, $Mg_2SiO_4$ and the like are formed in the resulting composition. Such low pH values are therefore not preferred. The temperature of the hydrolysis is generally in a range of 20°–100° C. with app. 60°–65° C. being particularly preferred.

After the solution has completely turned to a white gel, the gel is dried at 100°–150° C. and the mixture so dried is then heat-treated into an amorphous glass at 700°–950° C. or 1000°–1300° C. This amorphous glass is melted again, formed into a desired shape and then heat-treated for 1–6 hours in a range of 600°–1100° C., thereby obtaining a crystallized glass having excellent translucence and containing crystalline phases of tetrasilicon fluormica having a particle size of 2–15 µm on average and formed to 40 wt. % or more in a glass matrix phase.

The crystallized glass produced by the above-described sol-gel method is not different in crystallizability and properties from that produced by the oxide melting method.

In the present invention, slip casting or the like can be employed as the above-described forming method. It is only necessary to apply a desired forming method upon production of a crystallized glass so that nuclei of a desired size for pearls can be obtained.

The crystallized-glass-made artificial nuclei of this invention for pearls will now be discussed in terms of the chemical composition of the glass matrix phase other than the crystalline phases. The glass composition of the glass matrix phase after the completion of the heat treatment, that is, when crystals have been formed to 40 wt. % or more is preferably in the following range: 25–75 wt. % of $SiO_2$, 0–20 wt. % of MgO, 0–12 wt. % of F, 5–30 wt. % of $K_2O$, 5–35 wt. % of $ZrO_2$, 0.1–40 wt. % of CaO, 0.1–40 wt. % of $P_2O_5$, and 0.1–20% of BaO and/or SrO.

The crystallized-glass-made artificial nuclei of this invention for pearls, said nuclei having been produced from the above-described batch and containing a glass matrix phase of the above-described chemical composition are superior in all the required properties to the conventional artificial nuclei.

The present invention will hereinafter be described in further detail by the following examples. It should however be borne in mind that the present invention is not limited to or by the following examples. Examples 1–8 & Comparative Examples 1(a)–8(g)

Tables 1(1) to 1(4) present the glass compositions of Examples 1–8 and Comparative Examples 1(a)–8(g), which were used for the production of crystallized glasses for pearl nucleus materials.

The various pearl nucleus materials of Comparative Examples 1(a)–8(g) belong to the conventional art described herein. These conventional pearl nucleus materials will be described in further detail as follows:

In Comparative Example 1(a), natural nuclei were used.

In Comparative Example 2(b), kneaded nuclei (synthetic resin nuclei) were used. Namely, the material disclosed in Japanese Patent Laid-Open (Kokai) Nos. SHO 48-52594 and SHO 63-219325 was used.

In Comparative Example 3(c), the material disclosed in Japanese Patent Laid-Open (Kokai) No. SHO 60-259135 was used.

In Comparative Example 4(d), the material disclosed in Japanese Patent Publication (Kokoku) No. HEI 2-12537 and as relevant publications, in U.S. Pat. No. 3,689,293 and Japanese Patent Laid-Open (Kokai) Nos. SHO 62-7649 and HEI 1-115848.

In Comparative Example 5(e), the mica-base crystallized glass developed for dental applications and disclosed in U.S. Pat. Nos. 3,732,087, 4,431,420 and 4,652,312 and Japanese Patent Laid-Open (Kokai) No. HEI 5-194132 was used.

In Comparative Examples 6(f)–7(f), employed were crystallized glasses containing oxidized apatite or fluorapatite as primary crystalline phases, developed for use as artificial bones and also for dental applications and disclosed in Japanese Patent Publication (Kokoku) No. SHO 51-8970, Japanese Patent Laid-Open (Kokai) Nos. SHO 51-73019, SHO 57-191252, SHO 60-131849, SHO 60-137853 and SHO 62-72540.

In Comparative Example 8(g), the mica-base crystallized glass developed for dental applications and disclosed in Japanese Patent Laid-Open (Kokai) Nos. SHO 62-108750, HEI 2-149447, HEI 2-153839, HEI 2-153840 and HEI 2-153841 was used.

In Tables 1(2) and 1(4), (1) to (6) have the following meanings:

(1) ... $Fe_2O_3$
(2) ... AU
(3) ... $CO_2O_3$
(4) ... $MnO_2$
(5) ... Pigment
(6) ... Proteins In Tables 1 (2) and 1 (4), (A) indicates that the batch was composed of oxides and a fluoride (the oxide melting method), whereas (B) indicates that the batch was composed of metal alkoxides and a fluoride (the sol-gel method).

TABLE 1 (1)

| | Example | | | | | | | |
|---|---|---|---|---|---|---|---|---|
| Composition | 1 | 2 | 3 | 4 | 5 | 6 | 7 | 8 |
| $SiO_2$ | 41.9 | 45.3 | 51.4 | 52.5 | 57.2 | 57.9 | 60.7 | 62.0 |
| $Al_2O_3$ | | | | | | | | |
| $B_2O_3$ | | | | | | | | |
| MgO | 6.1 | 9.1 | 8.5 | 8.7 | 8.1 | 14.2 | 3.7 | 8.1 |
| $MgF_2$ | 7.8 | 6.9 | 11.2 | 11.4 | 7.9 | 6.9 | 15.2 | 9.0 |
| F | | | | | | | | |
| $K_2O$ | 8.1 | 8.5 | 10.3 | 10.5 | 15.1 | 8.6 | 7.9 | 7.6 |
| $ZrO_2$ | 11.1 | 9.4 | 4.1 | 4.2 | 0.1 | 0.1 | 0.1 | 0.9 |
| CaO | 17.9 | 4.3 | 5.0 | 2.5 | 1.3 | 2.1 | 1.0 | 1.5 |
| $P_2O_5$ | 7.0 | 15.3 | 4.2 | 2.1 | 1.0 | 1.6 | 1.0 | 1.3 |
| BaO | 0.1 | SrO 0.2 | 5.3 | 8.1 | 9.1 | 8.6 | 10.4 | 9.6 |

TABLE 1 (2)

| | Example | | | | | | | |
|---|---|---|---|---|---|---|---|---|
| | 1 | 2 | 3 | 4 | 5 | 6 | 7 | 8 |
| Composition | | | | | | | | |
| Colorant/pigment | | (1) 0.5 (4) 0.5 | | (2) 0.001 | (3) 0.2 | | | |
| $CaCO_3$ (powder) | | | | | | | | |
| Coral powder | | | | | | | | |
| Resin | | | | | | | | |
| Others | | | | | | | | |
| Batch | A | A | A | A | A | A | B | B |
| Heat treatment Tmp. (°C.) | 850 | 800 | 1000 | 1000 | 950 | 1000 | 900 | 1050 |
| Heat treatment time (hr) | 4 | 4 | 6 | 6 | 2 | 4 | 3 | 6 |

TABLE 1 (3)

| | Comparative Example | | | | | | | |
|---|---|---|---|---|---|---|---|---|
| Composition | 1(a) | 2(b) | 3(c) | 4(d) | 5(e) | 6(f) | 7(f) | 8(g) |
| $SiO_2$ | | | | 46.0 | 61.0 | | 34.2 | 57.2 |
| $Al_2O_3$ | | | | 16.0 | | | | |
| $B_2O_3$ | | | | 7.0 | | | | |
| MgO | | | | 17.0 | 9.0 | | 4.6 | 17.3 |
| $MgF_2$ | | | | | 13.0 | | | |
| F | | | | 4.0 | | | 0.3 | 5.5 |
| $K_2O$ | | | | 10.0 | 14.0 | | | 12.5 |
| $ZrO_2$ | | | | | 3.0 | | | 4.5 |
| CaO | | | | | | 44.1 | 44.9 | 1.6 |

TABLE 1 (3)-continued

| | Comparative Example | | | | | | | |
|---|---|---|---|---|---|---|---|---|
| Composition | 1(a) | 2(b) | 3(c) | 4(d) | 5(e) | 6(f) | 7(f) | 8(g) |
| $P_2O_5$ | | | | | | 55.9 | 16.0 | 1.4 |
| BaO | | | | | | | | |

TABLE 1 (4)

| | Comparative Example | | | | | | | |
|---|---|---|---|---|---|---|---|---|
| | 1(a) | 2(b) | 3(c) | 4(d) | 5(e) | 6(f) | 7(f) | 8(g) |
| Composition | | | | | | | | |
| Colorant/pigment | | (5) 17 | (5) 20 | | (1) 1.0 | | | |
| $CaCO_3$ (powder) | 100 | 70 | 40 | | | | | |
| Coral powder | | | 40 | | | | | |
| Resin | | 13 | | | | | | |
| Others | (6) | | | | | | | |
| Batch | | | | A | A | A | A | A |
| Heat treatment Tmp. (°C.) | — | 120 | 600 | 1100 | 1000 | 950 | 1050 | 1050 |
| Heat treatment time (hr) | — | 10 min | 10 min | 4 | 4 | 6 | 4 | 4 |

In each of Examples 1–8 and Comparative 1(a)–8(g), the oxides and fluoride proportioned in the corresponding composition presented in Table 1(1) or 1(3) were used as a batch. The batch was placed in a lidded platinum crucible and was then melted at about 1450° C. for about 4 hours in an electric furnace.

The molten glass so obtained was formed into blocks and as presented in Tables 1(2) and 1(4), were heat-treated at 950°–1050° C. for about 2–6 hours.

Next, the crystalline phases of the crystallized glass was observed by the X-ray powder method. The crystallized glasses of all the examples were found to contain tetrasilicon fluormica crystals formed therein.

Further, the crystallinity was measured from a peak height determined by the X-ray powder method while using a calibration curve. The crystallized glass was also examined by a scanning electron microscope to determined the average particle size of the tetrasilicon fluormica crystals.

With respect to the various crystallized glasses produced as described above, various physical properties were evaluated. They were also inserted in Akoya pearl oysters to produce pearls. The results are summarized in Tables 2(1) to 2(4).

Details of the evaluated properties presented in Tables 2(2) and 2(4) are as follows:

(1) Flexural strength was measured by forming scratches in the material, which had been formed in the shape of a rectangular block of 3×4×36 mm, with a #320 abrasive paper under water-free conditions and then testing the block at a span of 30 mm and a crosshead speed of 0.5 mm/min in accordance with a testing method similar to that specified in JIS R 1601.

(2) Vickers hardness was measured by using a mirror-finished plate of 25×25×5 mm and testing it under a load of 200 gf and a holding time of 15 sec in accordance with JIS Z 2251.

(3) Specific gravity was measured by the Archimedean principle following JIS Z 8807.

(4) Workability was by cutting a rectangular block of 10×10×20 mm with a dental air turbine and an electric engine (a dental hand piece driven by an electric motor) and evaluating the cut weight in accordance with a two-level ranking system consisting of excellent and poor.

(5) Chemical resistance loss was determined by using a mirror-finished plate of 25×25×5 mm, immersing it at 37° C. for 24 hours in a 0.5% aq. HCl solution and then measuring a weight loss per the surface area.

(6) The quality of translucence and color shade was determined by selecting a natural nucleus of uniform quality and visually evaluating each artificial nucleus relative to the natural nucleus as a standard in accordance with a two-level ranking system consisting of excellent and poor.

(7) Harmfulness to the tissue was determined by using nuclei which had been formed into true spheres having a diameter of 8.00±0.01 mm and then mirror finished.

Namely, with respect to nuclei of each crystallized glass produced as described above, they were inserted one by one in 100 1-year old Akoya pearl oysters and then cultured in the Ise Bay for 6 months from the middle of May to the middle of November. The percentage of died or de-nucleated Akoya pearl oysters was determined.

(8) Nacreous-layer-forming ability was determined by taking peals out of the shells which were still alive in the above test (7) and as a result of the culture, checking the respective percentages of pearls of 1st to 3rd quality classes. The pearls were cut in half, and the average thickness (μm) of their nacreous layers was determined.

(9) Percentage of pearls with nacreous layers cracked and/or flaked upon working was determined by checking the percentage of those developed cracks and/or flaking in the nacreous layers when the pearls were cut in half in the above test (8).

(10) Durability of commercial value was determined based on differences (in color changes, growth of cracks and/or flaking of nacreous layers) between those cut in half in the above test (9) and left over for 1 year in a room where the cut pearls were exposed to direct sunlight and those cut in half in the above test (i) and stored in a refrigerator for 1 year.

The abbreviations of principal crystalline phases in Tables 2(1) and 2(3) have the following meanings:

TSM: Tetrasilicon fluormica

Ph: Phlogopite

Ag: Aragonite

Ap: Fluorapatite or oxidized apatite

TCP: Tricalcium phosphate

Wo: Wollastonite

TABLE 2 (1)

| | Example | | | | | | | |
|---|---|---|---|---|---|---|---|---|
| | 1 | 2 | 3 | 4 | 5 | 6 | 7 | 8 |
| Principal crystalline phases | TSM | TSM | TSM | TSM | TSM | TSM | TSM | TSM |
| Crystallinity wt % | 46 | 43 | 63 | 60 | 51 | 45 | 53 | 56 |
| Average grobule size μm | 12 | 13 | 9 | 10 | 13 | 12 | 7 | 4 |
| $SiO_2$ | 27.6 | 34.0 | 39.0 | 42.2 | 56.8 | 58.6 | 63.2 | 69.0 |
| $Al_2O_3$ | | | | | | | | |
| $B_2O_3$ | | | | | | | | |
| MgO | 0.0 | 4.4 | 0.0 | 0.0 | 0.9 | 14.1 | 0.0 | 0.0 |
| F | 1.0 | 0.0 | 2.5 | 2.7 | 0.0 | 0.0 | 9.3 | 0.6 |
| $K_2O$ | 5.3 | 6.2 | 13.3 | 16.1 | 22.8 | 10.1 | 9.8 | 9.4 |
| $ZrO_2$ | 20.0 | 17.1 | 11.6 | 12.5 | 0.2 | 0.2 | 0.2 | 2.2 |
| CaO | 33.1 | 8.0 | 14.5 | 7.7 | 2.8 | 4.0 | 2.3 | 3.7 |
| $P_2O_5$ | 12.9 | 28.4 | 12.2 | 6.4 | 2.2 | 3.1 | 2.3 | 3.2 |
| BaO | 0.1 | SrO 0.1 | 6.8 | 12.4 | 13.8 | 10.1 | 12.9 | 11.9 |
| Colorant | | 1.9 | | | 0.4 | | | |

TABLE 2 (2)

| | Example | | | | | | | |
|---|---|---|---|---|---|---|---|---|
| | 1 | 2 | 3 | 4 | 5 | 6 | 7 | 8 |
| Flexural strength kgf/cm² | 1300 | 1250 | 1350 | 1350 | 1350 | 1300 | 1400 | 1450 |
| Vickers hardness | 300 | 300 | 350 | 340 | 360 | 380 | 400 | 400 |
| Specific gravity | 2.85 | 2.86 | 2.86 | 2.84 | 2.85 | 2.85 | 2.85 | 2.84 |
| Workability | Excellent | Excellent | Excellent | Excellent | Excellent | Excellent | Excellent | Excellent |
| Chemical resistance loss | 67.5 | 70.3 | 13.1 | 6.9 | 5.9 | 6.3 | 4.1 | 5.2 |
| Quality of translucence and color shade | Excellent | Excellent | Excellent | Excellent | Excellent | Excellent | Excellent | Excellent |
| Harmfulness (death/denucleation) | 1 | 1 | 0 | 2 | 3 | 2 | 1 | 2 |
| Nacreous layer forming ability | | | | | | | | |
| Percentage of 1st to 3rd classes | 83 | 80 | 82 | 80 | 78 | 79 | 79 | 79 |
| Thickness of nacreous layer | 400 | 400 | 350 | 300 | 250 | 250 | 240 | 250 |
| Percentage of pearls with nacreous layers cracked and/or flaked upon working | 0 | 0 | 0 | 0 | 0 | 0 | 0 | 0 |
| Durability of commercial value | Excellent | Excellent | Excellent | Excellent | Excellent | Excellent | Excellent | Excellent |

TABLE 2 (3)

| | Comparative Example | | | | | | | |
|---|---|---|---|---|---|---|---|---|
| | 1 | 2 | 3 | 4 | 5 | 6 | 7 | 8 |
| Principal crystalline phases | Ag | Ag | Ag | Ph | TSM | Ap, TCP | Ap, Wo | TSM, Ap |
| Crystallinity wt % | 100 | 70 | 80 | 45 | 71 | 60 | 72 | 62 |
| Average grobule size μm | — | 5 | 6 | ≧25 | 1.5 | ≦1 | — | 3 |

TABLE 2 (3)-continued

|  | Comparative Example | | | | | | | |
|---|---|---|---|---|---|---|---|---|
|  | 1 | 2 | 3 | 4 | 5 | 6 | 7 | 8 |
| $SiO_2$ |  |  |  | 49.5 | 65.5 |  | 53.6 | 63.3 |
| $Al_2O_3$ |  |  |  | 23.3 |  |  |  |  |
| $B_2O_3$ |  |  |  | 10.2 |  |  |  |  |
| MgO |  |  |  | 7.8 | 0.0 |  | 16.6 | 7.7 |
| F |  |  |  | 0.0 | 4.6 |  | 0.0 | 0.0 |
| $K_2O$ |  |  |  | 9.2 | 19.7 |  |  | 16.1 |
| $ZrO_2$ |  |  |  |  | 10.0 |  |  | 12.7 |
| CaO |  |  |  |  |  | 41.7 | 26.0 |  |
| $P_2O_5$ |  |  |  |  |  | 58.3 | 3.8 | 0.2 |
| BaO |  |  |  |  |  |  |  |  |
| Colorant |  |  |  |  |  |  |  |  |

TABLE 2 (4)

|  | Comparative Example | | | | | | | |
|---|---|---|---|---|---|---|---|---|
|  | 1 | 2 | 3 | 4 | 5 | 6 | 7 | 8 |
| Flexural strength kfg/cm$^2$ | — | 500 | 300 | 1200 | 2000 | 1200 | 1750 | 1800 |
| Vickers hardness | 140 | 200 | 250 | 230 | 430 | 600 | 690 | 400 |
| Specific gravity | 2.86 | 2.88 | 2.98 | 2.52 | 2.70 | 3.10 | 3.08 | 2.72 |
| Workability | Excellent | Excellent | Excellent | Excellent | Poor | Poor | Poor | Poor |
| Chemical resistance loss | 500 | 500 | 500 | 0.0 | 0.0 | 400 | 27.0 | 12.8 |
| Quality of translucence and color shade | Standard | Excellent | Poor | Poor | Poor | Poor | Poor | Excellent |
| Harmfulness (death/denucleation) | 10 | 11 | 10 | 20 | 20 | 5 | 5 | 7 |
| Nacreous layer forming ability |  |  |  |  |  |  |  |  |
| Percentage of 1st to 3rd classes | 76 | 76 | 76 | 60 | 61 | 82 | 81 | 79 |
| Thickness of nacreous layer | 150 | 140 | 150 | 50 | 50 | 400 | 400 | 250 |
| Percentage of pearls with nacreous layers cracked and/or flaked upon working | 0 | 0 | 10 | 60 | 60 | 0 | 0 | 0 |
| Durability of commercial value | Excellent | Excellent | Excellent | Poor | Poor | Excellent | Excellent | Poor |

As is evident from Tables 2(1) to 2(4), a comparison in workability, chemical resistance, translucence and color shade between the crystallized-glass-made artificial nuclei of this invention for pearls (Examples 1–8) and the conventional artificial nuclei for pearls [Comparative Examples 1(a)–8(g)] clearly indicates that the crystallized-glass-made artificial nuclei of this invention are superior in all the compared properties. It is also appreciated that the crystallized-glass-made artificial nuclei of this invention do not have harmfulness to the tissue, have very good forming ability of nacreous layers and are free from cracking and/or flaking at the nacreous layers upon working.

It is also understood that pearls produced using the above artificial nuclei of this invention have excellent aesthetics and a commercial value of superb durability.

What is claimed is:

1. In an artificial nucleus for a pearl, said nucleus being made of a crystallized glass, the improvement wherein the crystallized glass has been produced using a batch of the following composition:

$SiO_2$ . . . 40–65 wt. %
 MgO . . . 3–16 wt. %
 $MgF_2$ . . . 6.5–17 wt. %
 $K_2O$ . . . 7.5–18 wt. %
 $ZrO_2$ . . . 0.01–15 wt. %
 CaO . . . 0.1–20 wt. %
 $P_2O_5$ . . . 0.1–20 wt. %
 BaO and/or SrO . . . 0.1–13 wt. % and has crystalline phases composed primarily of tetrasilicon fluormica and formed in a glass matrix phase.

2. In a process for the production of artificial nuclei for pearls, said nuclei being made of a crystallized glass, the improvement wherein the process comprises:

providing, as a batch for the crystallized glass, a batch composed of oxides and a fluoride and having the following composition:

$SiO_2$ . . . 40–65 wt. %
 MgO . . . 3–16 wt. %
 $MgF_2$ . . . 6.5–17 wt. %
 $K_2O$ . . . 7.5–18 wt. %
 $ZrO_2$ . . . 0.01–15 wt. %
 CaO . . . 0.1–20 wt. %
 $P_2O_5$ . . . 0.1–20 wt. %
 BaO and/or SrO . . . 0.1–13 wt. % melting the batch into an uncrystallized glass; and heat-treating the uncrystallized glass so that crystalline tetrasilicon fluormica phases having an average particle size of 2–15 μm are formed to at least 40%, based on the weight of the crystallized glass, in a glass matrix phase.

3. A process according to claim 2, wherein when the crystalline tetrasilicon fluormica phases having the average particle size of 2–15 μm have been formed to at least 40%, based on the weight of the crystallized glass, in the glass matrix phase, the glass matrix phase accounting for at most 60% of the weight of the crystallized glass has the following composition:

$SiO_2$ . . . 25–75 wt. %
 MgO . . . 0–20 wt. %
 F . . . 0–12 wt. %
 $K_2O$ . . . 5–30 wt. %
 $ZrO_2$ . . . 5–35 wt. %
 CaO . . . 0.1–40 wt. %
 $P_2O_5$ . . . 0.1–40 wt. %
 BaO and/or SrO . . . 0.1–20 wt. %.

4. A process according to claim 2, wherein the heat-treatment is conducted by heating the uncrystallized glass in a temperature range of 600°–1200° C. for 1–6 hours so that crystalline tetrasilicon fluormica phases having an average particle size of 2–15 μm are formed to at least 40%, based on the weight of the crystallized glass, in a glass matrix phase.

5. A process according to claim 2, wherein metal alkoxides and a fluorine-containing compound are provided in proportions so that when converted to oxides and a fluoride, the following composition will be provided:

$SiO_2$ ... 40–65 wt. %
MgO ... 3–16 wt. %
$MgF_2$ ... 6.5–17 wt. %
$K_2O$ ... 7.5–18 wt. %
$ZrO_2$ ... 0.01–15 wt. %
CaO ... 0.1–20 wt. %
$P_2O_5$ ... 0.1–20 wt. %
BaO and/or SrO ... 0.1–13 wt. % and the metal alkoxides and the fluorine-containing compound are mixed and dissolved in a solvent, followed by hydrolysis, whereby a batch for the crystallized glass, said batch being composed of the oxides and fluoride in the above composition, is produced.

6. A process according to claim 5, wherein the metal alkoxides comprise $Si(OC_2H_5)_4$, $Mg(OCH_3)_2$, $KOCH_3$, $Zr(OC_4H_9)_4$, $Ca(OC_2H_5)_2$, $PO(OCH_3)_3$ and $Ba(OC_2H_5)_2$, and the fluorine-containing compound is $NH_2C_6H_4CF_3$.

7. A pearl obtained by inserting in a mother oyster an artificial nucleus for the pearl, said artificial nucleus being formed of a crystallized glass and having been produced from a batch of the following composition:

$SiO_2$ ... 40–65 wt. %
MgO ... 3–16 wt. %
$MgF_2$ ... 6.5–17 wt. %
$K_2O$ ... 7.5–18 wt. %
$ZrO_2$ ... 0.01–15 wt. %
CaO ... 0.1–20 wt. %
$P_2O_5$ ... 0.1–20 wt. %
BaO and/or SrO ... 0.1–13 wt. % by forming crystalline phases composed primarily of tetrasilicon fluormica in a glass matrix phase, and then culturing the mother oyster to form nacreous layers on a surface of the artificial nucleus.

* * * * *